UNITED STATES PATENT OFFICE.

HERMAN C. BECKMAN AND GEORGE E. DYCK, OF CHICAGO, ILLINOIS, ASSIGNORS TO NATIONAL SYNTHETIC PRODUCTS CO., OF CHICAGO, ILLINOIS, A CORPORATION OF NEW JERSEY.

PROCESS OF MAKING A LIQUID FOOD.

1,191,388.  Specification of Letters Patent.  Patented July 18, 1916.

No Drawing. Substitution and continuation of application Serial No. 631,791, filed June 7, 1911. (Abandoned.)
This application filed September 27, 1912. Serial No. 722,732.

*To all whom it may concern:*

Be it known that we, HERMAN C. BECKMAN and GEORGE E. DYCK, citizens of the United States, residing at Chicago, in the county of Cook and State of Illinois, have invented a certain new and useful Improvement in Processes of Making a Liquid Food, of which the following is a full, clear, concise, and exact description.

Our invention relates to a liquid food product and the process of making the same, the food product being useful for household and similar purposes either in the state or condition in which it is produced, or in other ways, as for example, by subjecting it to supplemental processes to form other products.

Prominent objects of our invention are to produce a healthful and nutritious liquid food product for household or other uses; to properly fix the same so that it will retain its proper condition after preparation, or in other words to prevent its separation or disintegration into its original or component parts; to afford a simple, practical and effective method or process of preparing such a food product in a rapid and expeditious manner; to reduce the cost of the product and the cost of preparing the same; to make the same palatable and tasty; and to accomplish the foregoing and other desirable results in a simple and expeditious manner.

In carrying out our invention we take a fatty or oily ingredient and a milk ingredient and combine the same with one another. The fatty or oily ingredient may be butter fat, beef fat, or other fat, animal oil, vegetable oils, or a mixture of animal and vegetable oils, or oleo or other oil, or some similar ingredient; and the milk base can be either full milk, skim milk, or condensed milk, or milk prepared from milk powder, or some similar ingredient. These ingredients are combined with one another preferably by mixing them together when in liquid form, the fats, if used, preferably being melted. Before actually combining these ingredients with one another, however, we usually mix with one or both, certain other ingredients which seem to us desirable to be used, and which can best be combined with the separate ingredients. For example, sometimes, although not always, we use a substance called lecithin, which is desirable because of the flavor it imparts to the finished product. This lecithin is preferably first dissolved in the oily or fatty ingredient in which it is readily soluble. Also milk sugar or other sugar is usually used, and this is desirably dissolved in the milk or milk solution, whatever form that may take. After these, and if desired, other ingredients are added to the fatty or oily and milk ingredients, the latter are combined or united, and then we pasteurize and emulsify the resulting mixture or compound. This can be done by well known forms of pasteurizing and emulsifying apparatus. We then take the pasteurized and emulsified mixture or compound and cool it, preferably by running it through some suitable cooling apparatus. We then add a certain ingredient which has a fixing or stabilizing effect, holding the resulting article or product in proper condition and preventing its separation into its original or component parts. A substance we have found very useful for this purpose is sucrate of lime (calcium sucrate), commonly known as "viscogen." When this last ingredient is added the product is finished and ready for use. The fixing ingredient such as sucrate of lime, is of special importance, as it serves to fix the article or product preventing the separation of the article into the component parts of which it is made, it being borne in mind that the article is made up of different ingredients, mechanically mixed together and therefore liable to separate. When viscogen or sucrate of lime is used the fixing effect seems to be obtained by thickening the liquid, making it more viscous and preventing a relative or separating movement of the various ingredients, especially the fatty or oily particles which tend to move about relatively. Were it not for this sucrate of lime or other fixing ingredient, the product would separate into its component parts very soon after manufacture and thus the product would soon become valueless.

We are aware that an effort has been made to prepare a product somewhat similar to ours by means of a mechanical admixture of skim milk and animal or vegetable oil. But this product would not be successful or useful because it would very soon separate into its component parts. In fact the article or product was specifically intended to form the basis of other articles which were to be made by supplemental processes very soon after the original product was prepared. We are also aware of the fact that it has been proposed to use sucrate of lime or viscogen in connection with natural cream for thickening the same, but this was simply to make more thick a cream which was thin, and was not at all what we do. There was no fixing or stabilizing effect such as we obtain, and one was necessary, for natural cream has no tendency to separate into different ingredients as an artificial article or product does.

It will be understood, of course, that in place of viscogen or sucrate of lime we can use other ingredients having a fixing effect, as for example sodium-bicarbonate or certain other calcium salts, compounds or solutions, lime water or certain other alkali substances. These would have substantially the same effect as sucrate of lime,—a chemical action changing the character of the product, making it more viscous and more uniform, and stabilizing or fixing it. In place of the above we can use other fixing agents, as for example, sugar in excess of that needed for sweetening purposes, rennet or other active ferments, gelatin, starch, gum tragacanth, gum arabic, Iceland moss, Irish moss, etc. All of these have a fixing or stabilizing effect.

If desired we can add to the article some ingredient which will serve as coloring matter, such ingredient being well known on the market. We can, if desired, add other ingredients. For instance, any one or more or all of the following: cholesterol, phytosteral, or lipochrome. These may be added either in addition to or in place of lecithin, and are preferably added prior to pasteurization. They tend to improve the flavor and palatability of the article. If desired we may also add, preferably prior to pasteurization, any one or more or all of the glycerids of the following acids: acetic, butyric, caproic, caprylic, capric, lauric, myristic, palmitic, stearic, arachidic and oleic.

The article or product so produced is wholesome and palatable and very nutritious, and is also pure, having been pasteurized in the process of manufacture.

This application is a substitute for and continuation of an application filed by us June 7, 1911, Serial No. 631,791, process of making artificial cream.

It will be understood that changes and modifications can be made without departing from the spirit of the invention.

What we claim is:

1. The process of making a liquid food product which consists in combining full milk, oleo oil and sucrate of lime, and pasteurizing and emulsifying the same.

2. The process of making a liquid food product which consists in combining full milk, oleo oil and sucrate of lime, and pasteurizing and emulsifying the same and adding flavoring and coloring ingredients.

3. The process of preparing a liquid food product which consists in combining an edible oleaginous ingredient, a milk ingredient, lecithin, and a fixing ingredient, and pasteurizing and emulsifying the same.

4. In a process of making artificial cream, the steps of preparing a mixture of fat, lecithin, and a milk base, and then pasteurizing and emulsifying the same.

5. The process of making artificial cream which consists in preparing a mixture of fat, lecithin, a milk base, then pasteurizing and emulsifying the same, and adding sucrate of lime.

6. The process of making a liquid food product which consists in mixing an edible oleaginous ingredient, and a milk ingredient, pasteurizing and emulsifying the same, and then adding a thickening agent.

7. The process of preparing a liquid food product which consists in combining an edible oleaginous ingredient, a milk ingredient and an ingredient adapted to make the product more viscous, and pasteurizing and emulsifying the same.

8. The process of making artificial cream which consists in preparing a mixture of an oleaginous substance, and a milk base, pasteurizing and emulsifying the same, and subjecting the resulting product to the action of a binding agent.

In witness whereof, we hereunto subscribe our names this 24th day of September, A. D. 1912, and this 27th day of September, A. D. 1912.

HERMAN C. BECKMAN.
GEORGE E. DYCK.

Witnesses to signature of Beckman:
ARTHUR J. WAND,
W. B. DETTMAR.

Witnesses to signature of Dyck:
HAZEL ANN JONES.
A. LYDA JONES.